United States Patent [19]

Simmons

[11] Patent Number: 4,645,879
[45] Date of Patent: Feb. 24, 1987

[54] CALL-ROUTING DEVICE

[75] Inventor: Richard M. Simmons, Cambridge, Mass.

[73] Assignee: Telelogic, Inc., Somerville, Mass.

[21] Appl. No.: 700,020

[22] Filed: Feb. 8, 1985

[51] Int. Cl.[4] .......................... H04M 1/27; H04M 3/58
[52] U.S. Cl. ..................................... 379/355; 379/212
[58] Field of Search .......... 179/18 BE, 18 BA, 18 B, 179/90 B, 90 BB, 90 BD, 18 AD, 27 FG, 27 FH

[56] References Cited

U.S. PATENT DOCUMENTS 4,447,676 5/1984 Harris et al. ................... 179/90 BD
4,468,529 8/1984 Samuel et al. ............. 179/90 BD X Primary Examiner—James L. Dwyer
Attorney, Agent, or Firm—Cesari and McKenna

[57] ABSTRACT

Telephone calls from an extension (32) on a private branch exchange (PBX) (14) are directed by an automatic telephone dialer (12a) to an outside line (18) of a local operating company or to a dedicated line (22) connected to the facilities of a specialized common carrier. The dialer is connected to an extension line (36) simply as another extension. A call from an extension (32) requesting an outside line is directed to the extension occupied by the dialer (12a), and a ring detector (40) detects the resultant ringing signal and alerts a controller (44). The controller sends a dial tone to the calling extension (32) and records the resultant dialed digits. It then momentarily interrupts its off-hook signal to cause the PBX to place the calling station (32) on hold and dials the appropriate destination. Once the dial has been replaced, it "hangs up," causing the PBX to connect the calling extension (32) to the destination that the automatic dialer has called.

4 Claims, 4 Drawing Figures

CALL-ROUTING DEVICE

BACKGROUND OF THE INVENTION

The present invention is directed to automatic telephone dialers, particularly dialers of the type used with private-branch-exchange (PBX) systems.

The recent advent in the United States of specialized common carriers (SCCs) that provide long-distance telephone networks has brought with it the development of automatic dialers because use of a specialized common carrier often necessitates the dialing of a large number of digits to gain access to the SCC's network. A common procedure for using a specialized common carrier involves two steps. First the user places a call through the local telephone operating company to the facilities of the SCC. The facilities of the SCC then send a prompting signal to the user to indicate that he should transmit his authorization code, which identifies the user for billing purposes. The user then dials the destination telephone number, and the facilities of the specialized common carrier operate to connect the calling station to the destination station via the SCC's network and the local operating company that services the destination.

This type of operation necessitates the dialing of a large number of digits; the caller must first dial a telephone number to access the specialized common carrier, then an authorization code, and finally a destination telephone number. Automatic dialers relieve the caller of the need to dial so many digits; they automatically dial the local access number of the specialized common carrier as well as the caller's authorization code. The caller then has only to dial the telephone number of the destination station.

Although automatic dialers have in the past included some modest complexity because of the need to recognize different types of dial tones and other prompting signals, their interconnections to other apparatus have been relatively simple; in a PBX system, the interconnections consist of a connection over one line to the PBX and over another line to the local telephone company. Thus, the provision of automatic dialing has not necessitated a wholesale change in the PBX, and the use of dialers has accordingly proved economical in many situations.

However, such dialers cannot be used by subscribers with centrex service, in which PBX-like features are provided without PBX equipment on the subscriber's premises. This is because conventional dialers must be interposed at the junction between the switching equipment and the "outside" line, and this junction is not on the subscriber's premises.

Another limitation of conventional dialers becomes apparent when the subscriber employs dedicated outside lines. Although the specialized-common-carrier subscriber usually obtains access to the SCC's facilities through connections provided by the local telephone operating company, this arrangement necessitates payment not only to the specialized common carrier but also to the local telephone company. Accordingly, it is desirable to have a separate dedicated circuit connected directly to the specialized common carrier. In fact, it may be desirable to employ dedicated lines for more than one specialized common carrier.

For the subscriber to use a conventional dialer to choose among the various outside lines, however, the dialer must be connected not only to several outside lines but also to the same number of PBX lines. The dialer would thus have to include its own complicated switching network; each dialer would have to be a miniature PBX. This requirement would eliminate much of the attractiveness of the dialer.

It is accordingly an object of the present invention to provide automatic dialing to subscribers having dedicated lines to specialized-common-carrier facilities but to omit the complicated switching arrangements that conventional dialers would require.

It is another object of the present invention to provide automatic dialing to subscribers who have centrex service.

SUMMARY OF THE INVENTION

The foregoing and related objects are achieved in a automatic dialer that takes advantage of a call-transfer feature provided by most centrex and PBX systems. In such systems, by "flashing"—typically, opening the hook switch momentarily—the called party puts the calling party on hold and obtains a dial tone. He then dials a third party, hangs up, and thereby connects the calling party to the third party.

To take advantage of this feature, the dialer of the present invention includes a port connected to a PBX (or centrex) line. A ring detector in the dialer monitors signals received via the port and generates a call signal when the port receives a ringing signal indicating that the dialer's station is being called; such a ring signal will occur whenever a user dials a predetermined code required for long-distance calls.

A control circuit in the automatic dialer responds to the call signal by placing across the dialer port the type of termination conventionally used to send an offhook indication to the PBX (or centrex) switching circuitry. The switching circuitry accordingly connects the automatic dialer to the calling extension. The dialer's control circuit then generates its own dial tone and sends it to the calling extension. This dial tone prompts the caller to dial the telephone number of the desired station. The dialer's control circuit records the telephone number that the user dials, and the automatic dialer then "flashes," typically, by momentarily removing the loop termination from the port. The PBX or centrex switching circuitry responds by putting the calling party on hold and giving the automatic dialer a new (and possibly different) dial tone.

The automatic dialer then places the call requested by the calling party. It may do this by operating the PBX or centrex switching circuitry in the normal manner to obtain an operating-company line and dial the telephone number. In the alternative, it may obtain an operating-company line by way of the PBX or centrex switching circuitry, place a call to the facilities of the specialized common carrier, and complete the call via the SCC. As a further alternative, in systems in which the subscriber can reach specialized common carriers over dedicated lines, the dialer may dial the number of an extension to which a dedicated specialized-common-carrier line is connected and then place the call over the dedicated line.

Once the call has been placed, the control circuit of the automatic dialer removes the termination, thereby dropping the line; this is sensed by the PBX or centrex switching circuitry, which then connects the calling party to the intended station.

The automatic dialer of the present invention thus provides significant advantages. It is so arranged that it can be connected merely as another extension station of the PBX or centrex system; it does not itself need to provide a connection between a PBX system and outside lines. Since it does not need to provide such a connection, it operates just as well with centrex systems as it does with PBX systems. In addition, since it can direct calls without its own direct connection to the outside lines, it does not require the addition of complicated switching circuitry to systems in which separate dedicated lines are used for access to specialized common carriers.

DETAILED DESCRIPTION OF THE PREFERRED EMBODIMENT

Figure 1:
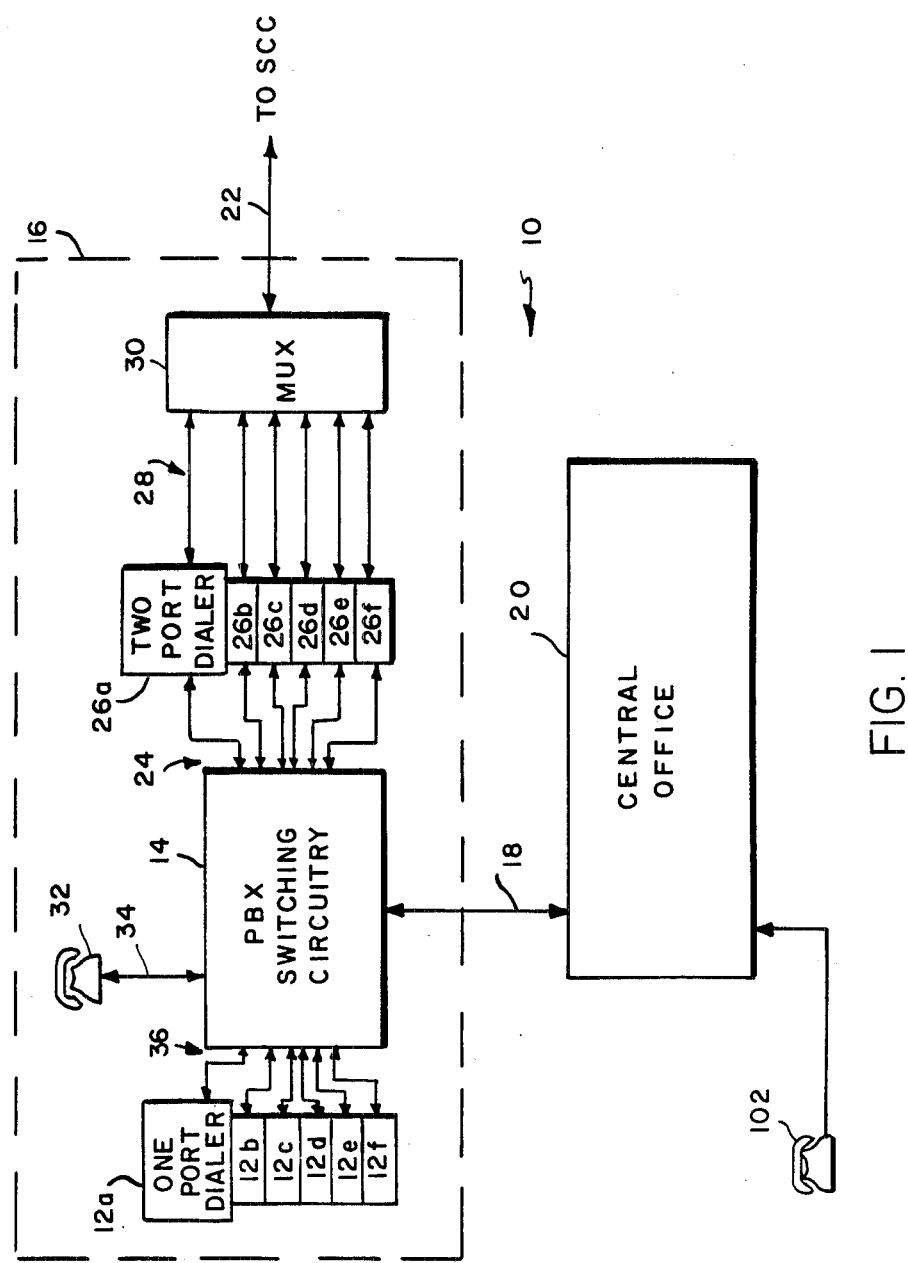
FIG. 1 is a block diagram of a PBX network of the type in which the dialer of the present invention might be used.

FIG. 1 depicts a telephone system 10 employing a number of novel one-port dialers 12a–f according to the present invention. For purposes of illustration, the dialers 12a–f are employed with private-branch-exchange (PBX) circuitry 14 located on the subscriber's premises 16. However, the dialer of the present invention can also be used with a so-called centrex system, in which PBX-like features are provided by equipment located off the user's premises, at a central office of the local operating company.

The PBX switching circuitry 14 is connected to a number of outside lines, such as line 18, which connect it to central-office equipment 20 at a location remote from the immediate premises 16. For purposes of illustration, the telephone system 10 is depicted as also including a dedicated line 22 connecting the PBX circuitry to the facilities of a specialized common carrier, although the dialer of the present invention can be employed advantageously in systems without such dedicated lines.

The connection to the dedicated line 22 includes a number of extension lines 24 from the PBX switching circuitry 14. These lines 24, which for purposes of illustration will be taken to be six in number, are all identified by the same extension number and form a "rotary group." That is, when a caller dials the extension number with which lines 24 are associated, the PBX switching circuitry 14 selects an unoccupied one of those lines and connects the caller to it.

Each of lines 24 is connected to an associated conventional two-port dialer, six dialers 26a–f being shown by way of example, corresponding to the six lines 24. These dialers are of conventional design, having separate input and output ports. They are connected by respective ones of six lines 28 from their output ports to a multiplexer 30, which typically time-division multiplexes the signals for transmission over the single dedicated line 22 to the facilities of the specialized common carrier. Of course, the multiplexer could be omitted in favor of direct connection of each line 28 to the SCC facilities.

In order to make an outside call, the caller operates a telephone set such as telephone set 32 on one of the PBX extension lines 34 and dials a predetermined outside-line access number. This number is the number of the extension with which all of the one-port dialers 12a–f are associated. The PBX switching circuitry then picks one of the lines 36 associated with that extension number to connect the caller with one of the one-port dialers 12a–f. The user then dials the telephone number of the station that he desires. The selected one-port dialer records this number, "flashes" the PBX switching circuitry 14 to put the caller at station 32 on hold, and places the call by requesting either the operating-company outside line 18 or the extension at which conventional dialers 26 are located and then dialing the destination station in the required manner. The dialer 12 then "hangs up," and the PBX switching circuitry 14 accordingly connects the caller on telephone 32 with the intended party.

Figure 2:
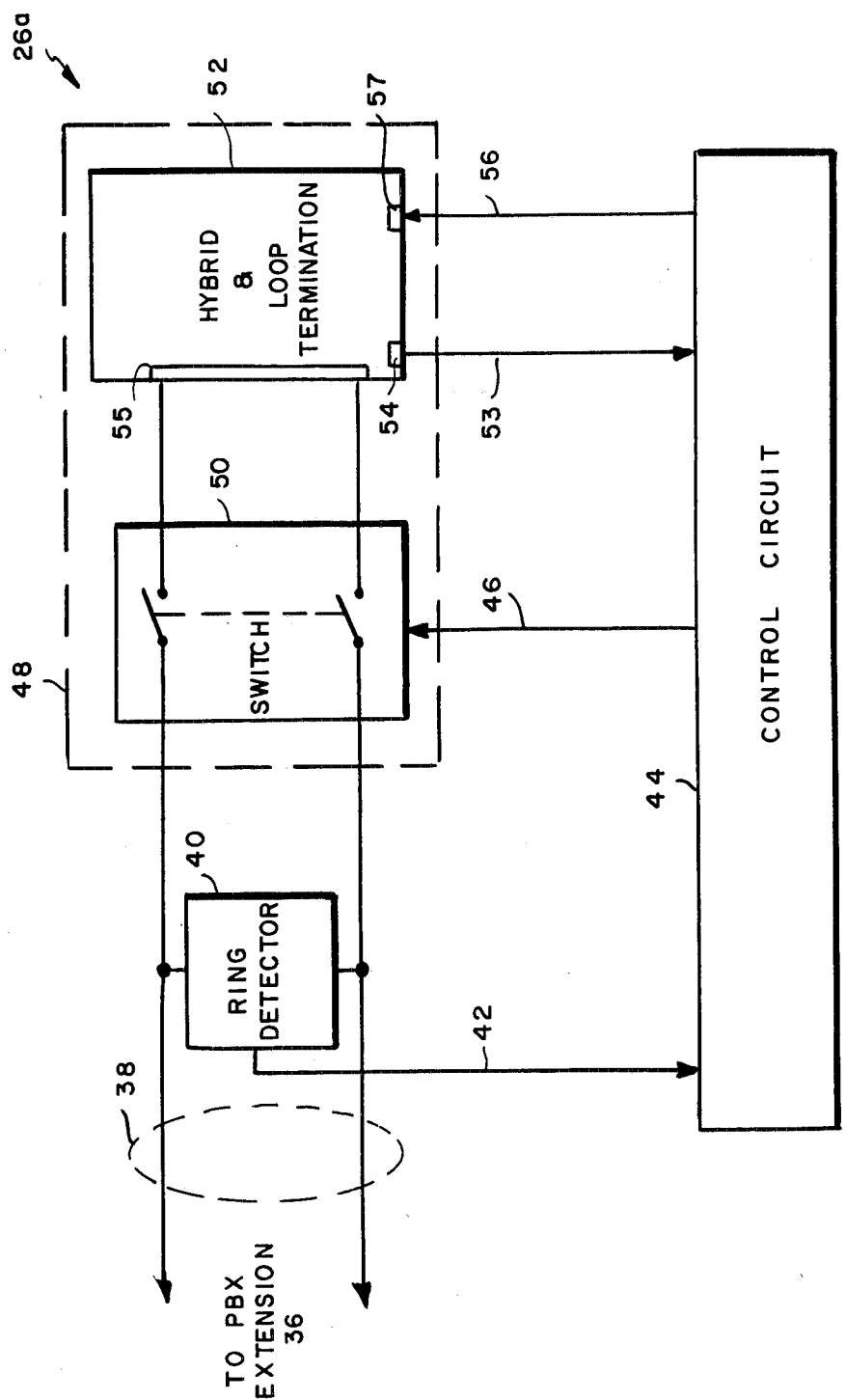
FIG. 2 is a block diagram of the dialer of the present invention.

The circuitry of one of the dialers 12a is depicted in block-diagram form in FIG. 2, in which a port 38 is connected to one of the PBX extension lines 36. A ring-detector circuit 40 is connected across the port. Circuit 40 generates a call signal whenever ringing current flows in the port 38. It sends the call signal over line 42 to a control circuit 44, which, in response, sends a control signal over line 46 to a termination circuit 48. The termination circuit 48 includes a (typically electronic) switch 50, which closes in response to the control signal on line 46 to connect the port 38 to a conventional hybrid and loop termination circuit 52, thereby sending an off-hook signal through switch 50 to the PBX switching circuitry 14.

Circuit 52 also includes conventional hybrid, or two-to-four-wire-conversion, circuitry of the type used to provide connections to the receiver and transmitter in a telephone handset. Line 53 represents the connection from the receiver port 54; the hybrid-and-loop-termination circuit 52 applies to line 53 signals that it receives over its common port 55, which the switch 50 connects to the dialer port 38. Circuit 52 applies to its common port 55 signals that it receives over line 56 at its transmitter port 57. The receiver signals provided over lines 53 are sent to the control circuit 44, and the transmitter signals on line 56 come from the control circuit 44, which includes circuitry for detecting a dial tone and dial signals and for generating a dial tone and dial signals of its own.

Figure 3A:
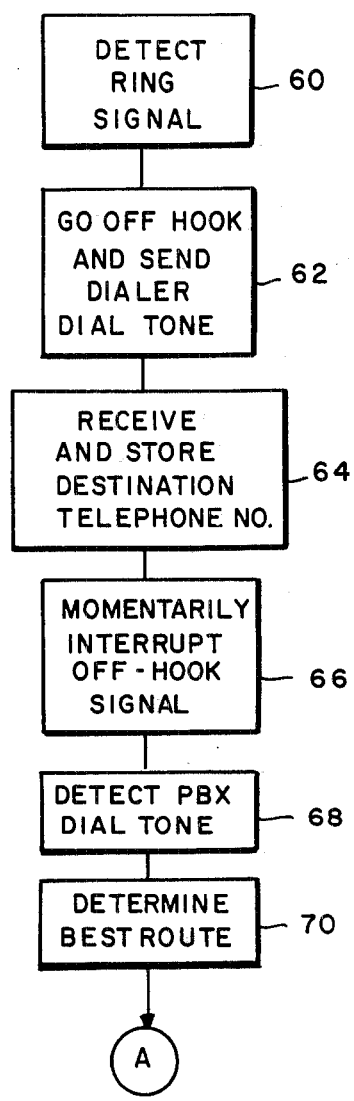
FIGS. 3A and 3B together constitute a flow chart illustrating the operation of the dialer.
Figure 3B:
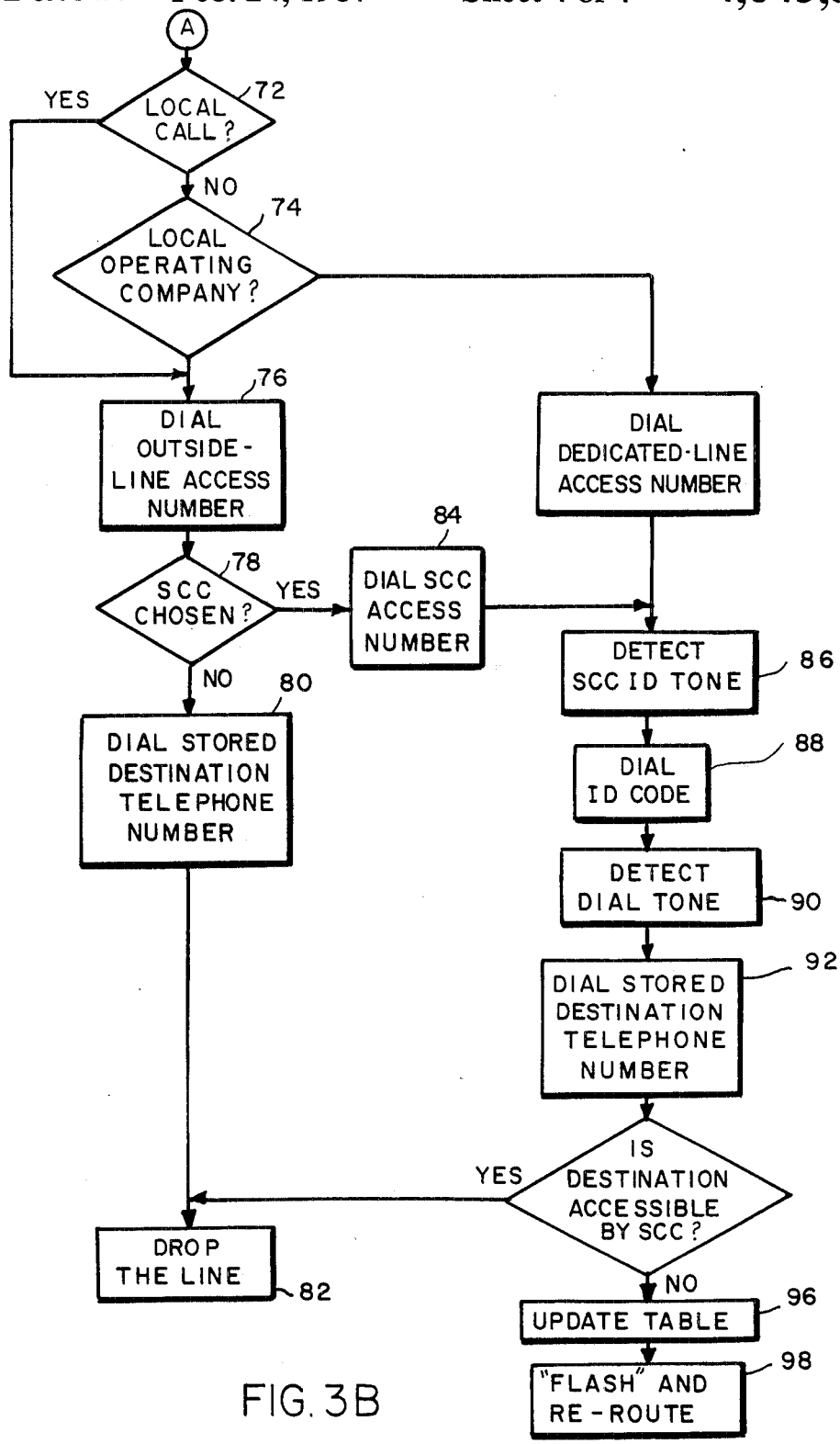

The operation of the circuitry of FIG. 2 will be described by reference to the flow chart of FIG. 3. In that flow chart, block 60 represents detection of ringing current by ring detector 40. This indicates that a caller at another station, such as station 32, has dialed a predetermined code representing a long-distance call. In response, the ring detector sends the control circuit 44 a call signal over line 42, and the conrol circuit 44 accordingly operates switch 50 to cause the dialer to go "off hook." Once the control circuit 44 has operated the switch 50 to go "off hook," it sends its own dial tone over lines 56 through hybrid-and-loop-termination circuit 52 and switch 50 to the PBX switching circuitry, which forwards the dial tone to the caller at station 32. This step is represented by block 62 and prompts the caller to dial the telephone number of the station that he wants to reach. The control circuit 44 receives the resulting dial signals over line 54 and records them, as block 64 indicates. When it has recorded the requisite number of digits, it sends a control signal over line 46 to open switch 50 momentarily. This step, represented by block 66, causes the PBX switching circuitry 14 to put the caller at station 32 on hold and send a new dial tone to one-port dialer 12a. When the control circuit 44 detects this new dial tone on line 53, as block 68 indicates, it places dial signals on line 56, thereby sending dial signals to the PBX switching circuitry 14.

Instead of including circuitry for detecting the new dial tone and placing dial signals when the new dial tone has been detected, the control circuit 44 could simply wait for a predetermined amount of time after it has opened switch 50 momentarily before sending dial signals. This is a simple arrangement and might be desirable in some cases because it avoids the need to include different types of detection circuitry to detect different types of dial tones.

The dial signals sent by the controller depend on the route the controller chooses. The route choice, represented by block 70, is made in accordance with a selection algorithm that is not part of the present invention and thus is not described here in detail. The control circuit 44 may inspect the digits dialed by the caller at station 32 and determine that the call is a local one, in which case the result of the decision represented by decision block 72 is positive. If the call is not a local call, the control circuit 44 may still determine that the best way to complete the call includes using the facilities of the local operating company, in which case the result of the decision represented by decision block 74 is positive. In either case, the control circuit 44 obtains an operating-company line (typically by dialing a "9"), as block 76 indicates, and waits for the new dial tone.

If the chosen route does not involve a specialized common carrier, the result of the decision represented by decision block 78 is negative, and control circuit 44 simply dials the telephone number of the intended station, as block 80 indicates. As soon as it completes dialing that number, the controller 44 operates switch 50 to remove the hybrid and loop termination 52 from the port 38, as block 82 indicates, and the PBX switching circuitry 14 accordingly connects station 32 with the station called by one-port dialer 12a.

If the chosen route involves a specialized common carrier, the result of the decision represented by decision block 78 is positive, and the controller 44 dials the access number of the local SCC facilities, as block 84 indicates. The specialized-common-carrier facilities respond by sending a tone to prompt the dialer 12a to send an identification code. The control circuit 14 receives this tone over line 53 and sends the required identification code over line 56, as blocks 86 and 88 indicate. If the identification code is accepted, the facilities of the specialized common carrier send a dial tone, which appears on line 53 and is detected by the controller 44, as block 90 indicates. The controller 44 then sends the destination code dialed by the caller at station 32 as block 92 indicates.

If the destination code represents a station to which the specialized common carrier has access, it places the call, the result of the test represented by block 94 is positive, and the dialer 12a drops the line as before by opening switch 50. If the number is one to which the specialized common carrier does not have access, the SCC facilities typically respond with a signal that indicates this fact. The control circuit 44 recognizes this signal, the result of the block 94 test is negative, and the control circuit responds by carrying out an operation similar to that described in U.S. Pat. No. 4,447,676 of William J. Harris et al. for an Automatic Dialer for Telephone Network Access Control. This operation is not part of the present invention and is not described here in detail. In general, however, the controller stores the leading digits of the telephone destination code in a table associated with that specialized common carrier. This step is represented by block 96. The next time it routes a call, it will first consult the table so that it does not soon attempt to route another call starting with those digits by way of the same common carrier.

Some PBX systems may have the capability of presenting the controller 44 with another dial tone in response to a second "flash" signal. If so, the controller "flashes" again, by momentarily opening switch 50, and then attempts to send the call by another route. These steps are represented by block 98. If the PBX circuitry does not have this capability, the control circuit merely terminates the call, and the caller must try again.

If, instead of employing line 18, the dialer 12a determines that the best way to place the call is to route it through dedicated line 22, it dials the digits of the extension associated with lines 24 and sends the dial signals over lines 56 through circuit 52 and switch 50 to the PBX switching circuitry 14, as block 100 indicates. In response, the PBX switching circuitry 14 connects one-port dialer 12a to one of the lines 24, and one of the conventional two-port dialers 26a–f answers by connecting one-port dialer 12a to the multiplexer 30. As FIG. 3 indicates, the procedure then continues in the same way as it does when an SCC-placed call employs the local central office.

It should be recognized at this point that a call could be placed over line 22 without using the conventional two-port dialers 26a–f. Specifically, lines 24 from the PBX switching circuitry 14 could be connected directly to the multiplexer 30, and operation would be essentially as described above except that the two-port dialers would not make the connection. In some systems employing the one-port dialer of the present invention, therefore, conventional two-port dialers will be omitted.

However, the two-port dialers 26a–f are included in FIG. 1 because some users may want to use the dedicated line 22 not only for calls to and from extensions on the user's premises 16 but also for calls to and from outside stations, such as station 102 in FIG. 1. In such an arrangement, some calls coming in over the dedicated line 22 from the SCC may be intended for the outside station 102, so the telephone number received over line 22 must be inspected to determine how the call is to be completed. Two-port dialers 26a–f perform this function. Their operation in doing so is not part of the present invention, so it will not be discussed here. It suffices to say that they complete the call without employing the one-port dialers 12a–f.

Similarly, the two-port dialers 26a–f are used to the exclusion of the one-port dialers 12a–f for calls from station 102 to the SCC by way of PBX switching circuitry 14. A capability for placing such calls is best implemented with a PBX system that has "direct inward dialing," in which the number that an outside caller dials includes the extension number so that the caller is connected directly with the intended extension without having to ask for the extension separately. (Theoretically, a centrex system could be employed, but it would be considerably less advantageous than a PBX system.) With such a PBX system, a caller at outside station 102 dials the extension of the two-port dialers 26a–f. (Outside callers should be barrred from dialing the one-port dialers 12a–f because those dialers do not use the SCC authorization code of the outside caller.)

PBX switching circuitry 14 accordingly sends a ring signal to one of the two-port dialers 26a-f. That dialer connects the outside user to the SCC, and the outside user then dials the digits necessary to complete the call.

The one-port dialer described above affords capabilities not provided by two-port dialers. Although the one-port dialer has been described in connection with PBX switching circuitry 14 located on the user's premises 16, it does not require that PBX circuitry be located there. This is because the one-port dialer of the present invention is connected only to an extension line; it does not have to be connected by a separate "outside" line to the central office. The present invention thus provides automatic dialing and call routing even in centrex systems. Furthermore, the dialer of the present invention can direct a call to one of several outside lines without employing complicated switching circuitry of its own. The dialer of the present invention thus represents a significant advance in the art.

I claim:

1. A telephone dialer for routing calls placed on a telephone system that includes a plurality of extension lines and a plurality of outside lines connected to facilities of common carriers and that further includes switching circuitry that makes connections between extension lines and between extension lines and outside lines, the switching circuitry being of the type that responds to a flashing signal from a called extension line by placing a calling extension line on hold and presenting a dial tone to the called extension line, that thereafter connects the called line to a third line designated by signals from the called line, and that thereafter connects the calling line to the third line in response to a subsequent removal of an off-hook signal from the called extension line, the telephone dialer comprising:
   A. a dialer port, adapted for connection to an associated extension line, for receiving signals from the extension line and transmitting signals thereover;
   B. a ring detector connected to monitor signals received over the dialer port and generate a call signal when the dialer port carries ringing signals caused by the placing of a call from a calling extension to the dialer;
   C. a termination circuit operable to place a loop termination across the dialer port and thereby send an off-hook signal to the switching circuitry, the termination circuit further being operable to remove the loop termination from the dialer port and thereby interrupt the off-hook signal;
   D. a control circuit connected to receive call signals from the ring detector, operate the termination circuit, and send and receive signals over the dialer port, the control circuit responding to call signals from the ring detector by operating the termination circuit to place a loop termination across the dialer port and by sending a dial tone to prompt a user at a calling extension to send dial signals that represent a destination code, the control circuit further detecting the dial signals from the calling extension and storing the destination code represented thereby, sending the flashing signal over the dialer port to cause the switching circuitry to put the calling extension on hold, selecting a common carrier over which to place the call dialed from the calling extension, sending signals necessary to place a call, over the selected common carrier, to the destination station indicated by the destination code, and operating the termination circuit to remove the termination loop from the dialer port so as to release the line connected to the destination station and cause the switching circuitry to connect that line to the calling extension line.

2. A telephone dialer as defined in claim 1 wherein:
   A. the flashing signal to which the switching circuitry responds is a momentary interruption in an off-hook signal; and
   B. the control circuit sends the flashing signal over the dialer port by operating the termination circuit to remove the loop termination momentarily from the dialer port.

3. A telephone dialer as defined in claim 2 wherein the termination circuit includes a hybrid-and-loop-termination circuit including the loop termination and also includes a switch for connecting the hybrid-and-loop-termination circuit to the dialer port, the switch being operable by the control circuit to place the hybrid-and-loop-termination circuit across the dialer port and to remove the hybrid-and-loop-termination circuit from the dialer port.

4. A dialer as defined in claim 3 wherein the hybrid-and-loop-termination circuit includes a common port, a receiver port, and a transmitter port, the common port being connected to the switch for connection and disconnection of the common port to and from the dialer port, the hybrid-and-loop-termination circuit placing on the common port signals applied to the transmitter port and applying to the receiver port signals received from the dialer port over the common port.

* * * * *